June 23, 1959　　　　E. P. TURNER　　　　2,891,643
CLUTCH-BRAKE MOTORS

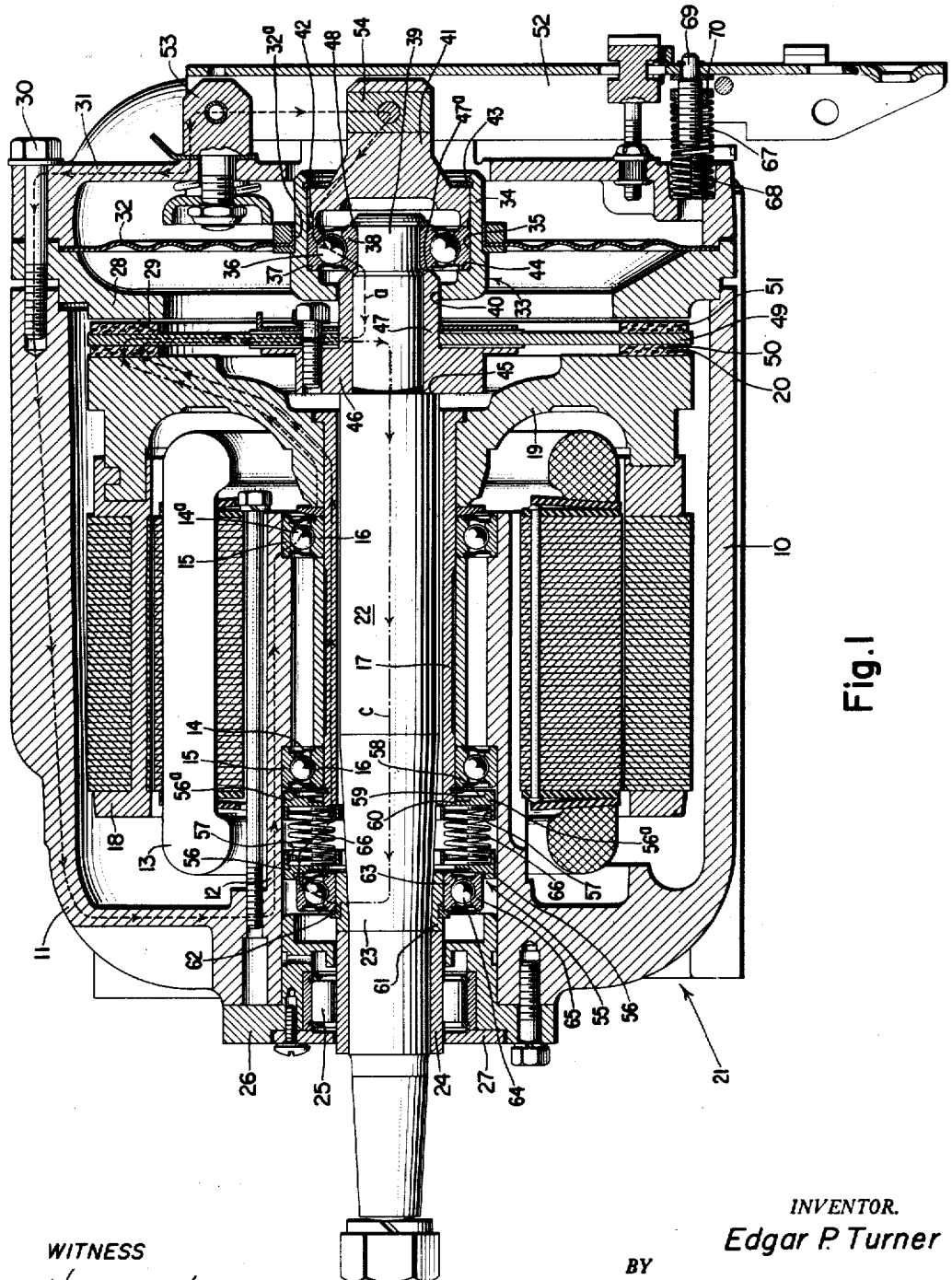

Filed July 11, 1957　　　　　　　　　　　　　　2 Sheets-Sheet 2

WITNESS
William Martins

INVENTOR.
Edgar P. Turner
BY
Marshall J. Breen
ATTORNEY ary Office 2,891,643
Patented June 23, 1959

2,891,643

CLUTCH-BRAKE MOTORS

Edgar P. Turner, Watchung, N.J., assignor to The Singer Manufacturing Company, Elizabeth, N.J., a corporation of New Jersey Application July 11, 1957, Serial No. 671,264

7 Claims. (Cl. 192—18)

This invention relates to clutch-brake motors and more particularly to the heavy duty type which is adapted to drive a heavy load and which is repeatedly started and stopped.

The clutch-brake motor of the general type forming the subject matter of the present invention includes a continuously operating motor driving a flywheel. A rotatable driven shaft is slidably mounted within the clutch-brake motor frame so that the clutch-brake disc carried thereon may be selectively engaged with a brake to restrain the shaft against rotation or may be engaged with the flywheel to rotate the shaft and provide the torque for driving a machine, as for instance, a loom. A clutch-brake motor of this type is disclosed in my U.S. Patent No. 2,717,967.

In the patented construction two axially spaced ball bearings are used to journal the flywheel in the frame and a clutch controlling ball bearing, mounted for axial movement on the frame, is fixedly secured to one end of the driven shaft. The ball bearings are arranged such that when the clutch-brake disc is forced into engagement with the flywheel there is created an end thrust load on one of the running ball bearings and on the clutch controlling ball bearing equal in magnitude to the thrust load on the clutch-brake disc and flywheel. A distribution of the clutch thrust load on the ball bearings in this manner limits the clutch thrust loading to the rated thrust load capacity of the ball bearings. This clutch thrust loading limitation is undesirable, especially under conditions when the load to be driven by the clutch-brake motor is such that in order to transmit the required driving torque to the driven shaft the clutch thrust loading must, of necessity, exceed that of the rated thrust load capacity of the ball bearings. Under these conditions it is evident that the ball bearings would eventually fail.

It is therefore an object of the present invention to provide an improved clutch brake motor including therein an arrangement which is effective to overcome the above described limitation.

In the drawings:

Fig. 1 is a side elevational view in cross section of a clutch-brake motor constructed in accordance with the present invention.

Figure 3:
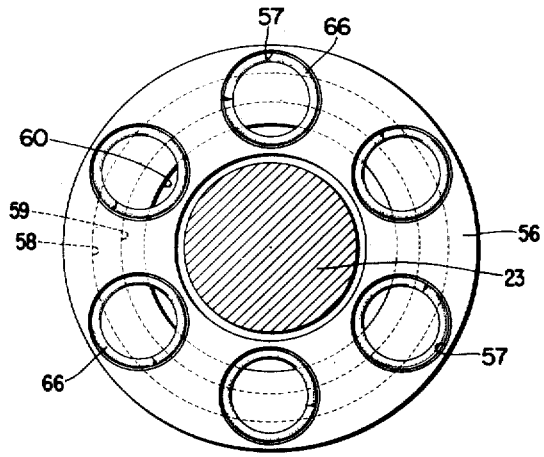
Fig. 3 is an end elevational view of the clutch preloading device taken substantially along the lines 3—3 of Fig. 2.

Referring now to the drawings, the clutch brake motor comprises a substantially cylindrical housing or casing 10 formed at one end with an integral end closure bell 11 carrying an inwardly extending tubular support 12 upon which is mounted a motor stator 13.

Within the bore of the tubular support 12 are ball bearings 14 and 14a, each of these ball bearings 14 and 14a has an outer race 15 mounted in the tubular support 12 and an inner race 16 secured to a sleeve shaft 17 upon which is fixedly mounted a motor rotor 18 disposed concentric with the stator 13. The inner end of the rotor 18 is secured to a circular flywheel 19 having an annular surface forming a friction clutch face 20. The above described structure forms a complete motor assembly 21.

Extending through the sleeve shaft 17 is a driven shaft 22 having a portion 23 tapering toward an outer end of reduced diameter upon which is pressed the inner race 24 of a roller bearing 25, the outer race of which is carried by an end cap 26 fastened to the end bell 11 and fitting within the bore of the tubular support 12. Holding the roller bearing 25 in place and providing a sealing plate to prevent dirt from entering the bearing 25 is an annular plate 27. The exposed end of the driven shaft 22 may, as shown, be tapered and is provided with fastening arrangement to accommodate a driving element, as for instance a gear, for the purpose of transmitting power to the machine to be driven by the motor 21.

As shown in Fig. 1, the right end of the casing 10 carries a brake ring 28 having a brake face 29, the brake ring 28 being fastened to the casing 10 in a manner such that the brake face 29 may be axially adjusted relatively to the clutch face 20. For a more detailed description of the adjustable feature of the brake ring reference may be made to my U.S. Patent No. 2,717,967. Superposed over the brake ring 28 and secured thereto and to the casing 10, as by screws 30, is a backing plate 31. Clamped between the mating faces of the brake ring 28 and the backing plate 31 is an outer edge of a flexible supporting diaphragm 32 having a central circular opening 32a located concentric with the driven shaft 22 and in which opening 32a there is carried the clutch control bearing unit 33. As more completely described in the above identified patent the supporting diaphragm 32 is made from a metallic material and is formed with a plurality of concentric corrugations to provide greater flexibility and thereby to permit the axial shifting of the clutch control bearing unit 33.

The clutch control bearing assembly 33 comprises a bearing cup 34 having a bearing receiving bore 35 in which there is seated a ball bearing 36 having an outer race 37 in engagement with the walls of the bore 35 and an inner race 38 secured to a reduced end 39 of the driven shaft 22, which reduced end 39 enters the bearing cup 34 through an opening 40 provided in the base of the cup 34 coaxial with the bearing receiving bore 35. Also seated within the bearing bore 35 is a control member 41 having a circular lip 42 held in engagement with the outer race 37 by a retainer ring 43 and forcing the outer race 37 against a shoulder 44 formed in the base of the bearing cup 34.

Abutting a shoulder 45 on the driven shaft 22 and secured thereto, as by a press fit, is a clutch-brake disc securing collar 46 having a hub 47 extending through the opening 40. The end face 47a of the hub 47 lies in a plane containing the bearing cup shoulder 45 and engages the inner race 38 which is held on the shaft 22 by a retaining ring 48 thereby to fix the clutch controlling ball bearing 36 against movement relatively to the driven shaft 22.

Carried on the hub 47 and fastened to the collar 46 against turning movement relatively thereto, is a circular clutch brake disc 49, having an outer annular portion disposed between the clutch face 20 and the brake face 29, and to each side of which is secured a layer of friction material providing a clutch facing 50 and brake facing 51 which when the driven shaft 22 is selectively shifted axially to move the clutch-brake disc 49 into engagement with either the clutch or brake faces 20 or 29 is effective to create sufficient friction between the contacting faces to drive or brake the driven shaft 22.

The driven shaft 22 may be moved axially by an actuating lever 52 pivotally secured adjacent its upper end to a lug 53 formed on the backing plate 31 and connected at its lower end to an operating device, not shown, for pivoting the lever 52 either to the left or to the right. Connected intermediate the ends of the actuating lever 52 is a shank 54 of the control shaft 41. Hence, upon moving the actuating lever 52 the movement thereof is transmitted by the control member 41 to the clutch control bearing unit 33. Since this unit 33 is fixed to the driven shaft 22 by means of the ball bearing 36 and is carried by the flexible diaphragm 32, it is readily apparent that the movement of the actuating lever will also cause movement of the driven shaft 22.

Under operating conditions the force provided by the actuating lever is effective to exert the necessary clutch thrust load for holding the clutch faces 50 and 20 in driving engagement thereby to transmit a driving torque to the driven shaft 22. Heretofore, in the structure disclosed in my aforementioned patent this clutch thrust load through the actuating lever 52 results in equal thrusts being transmitted through the ball bearing 36 and also through the ball bearing 14a as shown by the dash force line a.

It is to be noted that in this prior structure the ball bearing 36 and the ball bearing 14a are each subjected to an end thrust loading equal to the clutch thrust load. However, none of the clutch thrust load is transmitted to the outer running ball bearing 14. Thus, in the event the load of the machine to be driven by the clutch brake motor is such that a high driving torque must be transmitted to the driven shaft 22 it may necessitate that the clutch faces 50 and 20 be held in driving engagement with a thrust load exceeding the rated thrust load capacity of the ball bearings 14a and 36. A clutch thrust load of this magnitude results in a breakdown of the ball bearings and limits the use of the clutch-brake motor to machine loads which do not require excessively high driving torques.

To obviate this condition of transmitting the entire clutch load through the ball bearings 36 and 14a there is provided by the present invention a new and novel arrangement which is incorporated into the clutch-brake motor such that the clutch thrust load is distributed between bearings 14a, 36 and 65 for permitting the clutch brake motor to be utilized with heavy loads requiring high driving torques.

Figure 2:
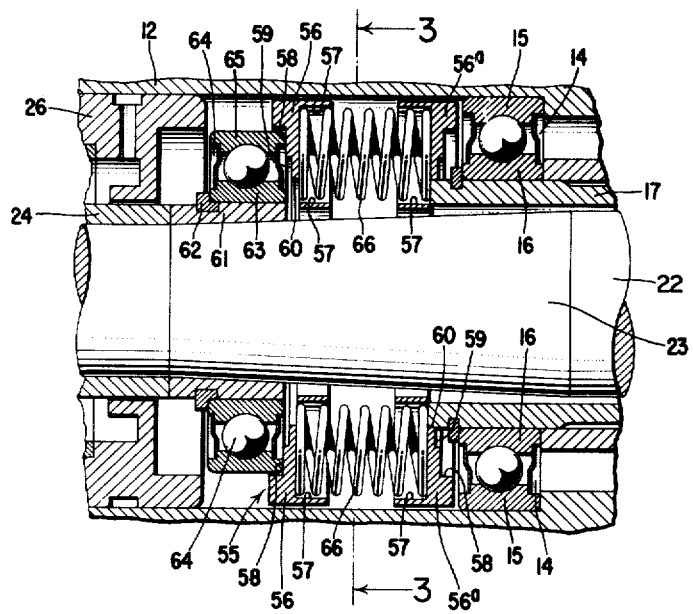
Fig. 2 is a fragmentary side elevational view of the clutch-brake motor showing on an enlarged scale the clutch preloading device incorporated therein.

This may be accomplished as shown, particularly in Figs. 2 and 3, by a clutch preloading unit 55 incorporated into the clutch-brake motor in the motor unit section 21. The preloading unit 55 comprises a pair of spaced annular retaining rings 56 and 56a each having formed on one face thereof a plurality of radially equispaced spring retaining openings 57 and on their opposite face the rings 56 and 56a are formed with three concentric circular stepped recesses 58, 59 and 60. Fixed by a retaining ring 62 against axial movement on a sleeve 61 press fitted on the tapered portion 21 of the driven shaft 22 is an inner race 63 of a ball bearing 64 of which an outer race 65 seats within the recess 58 of the annular retaining ring 56 for holding the latter concentric with the driven shaft 22. The other annular retaining ring 56a is carried on the end of the sleeve shaft 17 which extends beyond the race 16. The end of the sleeve shaft 17 seats within the circular recess 60 with a snug fit such that the retaining ring 56 is rotatable with the sleeve shaft 17. The retaining rings 56 and 56a are arranged such that the openings 57 are axially aligned in pairs and receive compression springs 66 for applying a force through the ball bearing 64 fixedly secured to the shaft 22, thereby to urge the shaft 22 to the left in the direction of clutch engagement. As shown by the dot-dash force line c the spring 66 also exerts an equal and opposite force on the sleeve shaft 17 directly to the flywheel clutch face without subjecting the inner and outer running ball bearings 14 and 14a to a thrust loading. To achieve a maximum clutch preloading force the springs 66 are selected such that they apply a thrust load through the ball bearings 64 substantially equal to the rated thrust load capacity thereof.

As is customary in clutch brake motors, there is provided a means for urging the brake faces 51 and 29 into brake engagement when the clutch faces 50 and 20 are not held in engagement. While this may be accomplished in various ways, as shown, there is provided a brake return spring 67 of which one end is seated within a hollow 68 formed in the backing plate 31 and the other end encircles the threaded end of a stud 69 carried on the lower end of the actuating lever 52. Threaded on the stud 69 and engaging the free end of the brake return spring 67 is an adjustment nut 70 which upon turning permits the adjustment of the brake spring 67 such that the force exerted thereby on the actuating lever 52 is sufficient to overcome the force exerted by the clutch preloading unit 55. Hence, the actuating lever 52 is normally urged to the right as viewed in Fig. 1 causing the driven shaft 22 to be urged in the same direction and thereby to position the brake face 51 in engagement with the brake face 29. In the brake engaged position the driven shaft 22 is stationary and the clutch preloading unit, of which the left retainer ring 56 is carried on the outer race 65 of the ball bearing 64 and the right retainer ring 56a fixed on the sleeve shaft 17 journaled in the running ball bearings 14 and 14a, is synchronously rotatable with the continuously rotating rotor 18 supported on the sleeve shaft 17.

In order to engage the clutch faces 50 and 20 the force applied by the actuating lever 52 must, of course, be sufficient to overcome the action of the brake return spring 67 whereupon the clutch preloading unit 55 is effective to shift the driven shaft 22 to the left and position the clutch faces 50 and 20 in engagement under the influence of the force exerted by the springs 66 and thereby rotate the driven shaft 22. Should the load requirements of the machine be such that the clutch thrust load provided by the clutch preloading unit 55 is inadequate to hold the clutch faces 50 and 20 in driving engagement and thereby be incapable of transmitting the necessary torque to the driven shaft 22, the additional force to achieve the requisite clutch thrust loading is applied by the actuating lever 52.

It is to be observed that the clutch thrust loading applied by the clutch preloading unit is substantially constant and that the force provided by the power operating means is additive therewith to the extent necessary to achieve the clutch thrust load for generating the torque required by a machine to be driven by the clutch-brake motor. The clutch thrust load provided by the additional force as shown by the dash force line a causes an end thrust load on the clutch throw-out ball bearing 36 and the inner running ball bearing 14a, the remaining ball bearings being free of any end thrust loading derived from the application of force from the actuating lever 52.

It is readily apparent that when the clutch faces 50 and 20 are in driving clutch engagement under the influence of the spring biasing force of the clutch preloading unit 55 and the force applied by the actuating lever 52, the clutch preloading unit ball bearing 65, clutch control ball bearing 36 and the ball bearing 14a are subject to end thrust loading. However, the end thrust loading received on the clutch control ball bearing 36 and the inner running ball bearing 14a is subject only to the end thrust load created by the force applied through the actuating lever 52 and these bearings 36 and 14a do not receive any end thrust loading from the clutch engaging force exerted by the clutch preloading unit 55. The clutch engaging force of the clutch preloading unit 55 is arranged to apply a constant end thrust loading solely on the ball bearing 65 and does not create any end thrust load on the running ball bearings 14 and 14a.

A distribution of the end thrust loading on the ball bearings in the above described manner provides a device capable of overcoming the limitations encountered in prior clutch brake motors characterized by an axially shiftable driven shaft. In these motors the entire force necessary to hold the clutch faces in engagement is transmitted as a thrust load in both the clutch control ball bearings and inner running ball bearings. As pointed out heretofore, this condition limits the clutch thrust loading to that of the rated thrust load capacity of the affected ball bearings.

By the present structure wherein the clutch-brake motor is provided with a clutch preloading unit 55 it is evident that when the clutch control ball bearings 36, and inner running ball bearing 14a are subject to an end thrust loading substantially equal to the rated thrust load capacity thereof there may be transmitted to the driven shaft 22 driving torques substantially doubling that capable of being achieved by the prior art structure without encountering bearing failure.

Having thus set forth the nature of the invention, what I claim herein is:

1. A clutch-brake motor comprising a casing, a rotor carried by said casing, driving means connected to said rotor and having a clutch face, a driven shaft axially slidable and rotatably journaled in said casing, a clutch-brake disc secured to said driven shaft, a clutch control ball bearing having a specified rated thrust load fixedly mounted on one end of said driven shaft, an actuating member operatively engaging said clutch control ball bearing for applying a force thereto to slide said driven shaft axially and position said clutch-brake disc in driving engagement with said clutch face to rotate said driven shaft, the force applied by said actuating member creating an end thrust load on said clutch control ball bearing, and clutch preloading means carried within said housing and operatively engaging said driven shaft for applying a clutch loading force, said clutch loading force being independent of said force applied by said actuating member through said clutch control ball bearing and being additive therewith whereby said clutch-brake disc and flywheel may be held in driving engagement with a clutch thrust load exceeding the specific rated thrust load capacity of said control ball bearing.

2. A clutch-brake motor comprising a casing, a rotor carried by said casing, driving means connected to said rotor and having a clutch face, a driven shaft axially slidable and rotatably journaled in said casing, a clutch-brake disc secured to said driven shaft, a clutch control ball bearing having a specified rated thrust load fixedly mounted on one end of said driven shaft, an actuating member operatively engaging said clutch control ball bearing for applying force thereto to slide said driven shaft axially and position said clutch-brake in driving engagement with said clutch face to rotate said driven shaft, said force applied by said actuating member creating an end thrust load on said clutch control ball bearing, and clutch preloading means including spring means carried within said housing and operatively engaging said shaft remote from said clutch control ball bearing for applying a clutch loading force, said clutch loading force being independent of said force applied by said actuating member through said clutch throw-out ball bearing and being additive therewith whereby said clutch-brake disc and flywheel may be held in driving engagement with a clutch thrust load exceeding the specified rated thrust load capacity of said clutch control bearing.

3. A clutch-brake motor comprising a casing, a rotor carried by said casing, driving means connected to said rotor and having a clutch face, a driven shaft axially slidable and rotatably journaled in said casing, a clutch-brake disc secured to said driven shaft, a clutch control ball bearing having a specified rated thrust load fixedly mounted on one end of said driven shaft, an actuating member operatively engaging said clutch control ball bearing for applying force thereto to slide said driven shaft axially and position said clutch-brake disc in driving engagement wth said clutch face to rotate said driven shaft, said force applied by said actuating member creating an end thrust load on said clutch control ball bearing, and clutch preloading means including a ball bearing secured to said driven shaft, spring means carried within said housing and rotatable with said rotor, said spring means being operatively engageable with said ball bearing for applying a clutch loading force on said driven shaft independent of said force applied by said actuating member through said clutch control ball bearing and being additive therewith whereby said clutch-brake disc may be held in driving engagement with a thrust exceeding the specified rated thrust load capacity of said clutch control bearing.

4. A clutch-brake motor comprising a housing, a rotor carried by said housing, driving means connected to said rotor and having an annular clutch face, brake means carried by said housing and having an annular brake face axially spaced from said clutch face, a driven shaft rotatably journaled and axially slidably carried in said housing, a clutch-brake disc secured to said driven shaft and being disposed between said clutch and brake faces, a clutch controlling ball bearing fixed to said shaft, means connected to said housing for supporting said bearing for axial shifting movement, an actuating member operatively engaging and being movable in one direction for applying a force through said clutch controlling ball bearing to slide said drive shaft axially and position said clutch-brake disc in engagement with said clutch face to rotate said driven shaft, spring means carried by said rotor for applying a clutch loading force on said driven shaft independent of said force applied by said actuating member through said clutch controlling ball bearing and additive therewith.

5. A clutch-brake motor comprising a casing, a rotor including driving means, a pair of ball bearings journaling said motor within said casing, a driven shaft axially slidable and rotatably journaled in said casing, a clutch-brake disc secured to said driven shaft, a clutch control ball bearing fixedly mounted on one end of said driven shaft, a mechanical actuating member operatively engaging said clutch control ball bearing for applying a force thereto to slide said driven shaft axially and position said clutch-brake disc in driving engagement with said clutch face to rotate said driven shaft, and clutch preloading means carried by said rotor and said driven shaft applying a clutch loading force on said driven shaft independently of said force applied by said actuating member through said clutch control ball bearing.

6. A clutch-brake motor haviing a casing, a rotor shaft journaled in said casing, a driven shaft journaled in said casing, a clutch-brake disc secured to said driven shaft, antifriction means fixed to said driven shaft, a mechanical actuating member connected to said antifriction means for moving said driven shaft endwise, and compression spring means reacting between said rotor shaft and said driven shaft for urging said shafts in opposite directions.

7. A clutch-brake motor having a casing, a rotor shaft journaled in said casing, a rotor carried by said shaft, a clutch element actuated by said rotor, a driven shaft arranged coaxially with said rotor shaft and journaled in said casing, a clutch-brake disc secured to said driven shaft and engageable with said clutch element, mechanical means connected to said driven shaft for moving said shaft endwise to cause said disc to engage said clutch element, and compression spring means reacting between said rotor shaft and said driven shaft for urging said disc into engagement with said clutch element.

References Cited in the file of this patent

UNITED STATES PATENTS

| | | |
|---|---|---|
| 1,723,468 | Colt | Aug. 6, 1929 |
| 2,428,336 | Munschauer | Sept. 30, 1947 |
| 2,587,230 | Schaad | Feb. 26, 1952 |
| 2,618,368 | Hoover | Nov. 18, 1952 |
| 2,717,967 | Turner | Sept. 13, 1955 |